United States Patent

[11] 3,634,615

[72] Inventors Reiichi Sasaki;
Yoshitomi Nagaoka, both of Osaka, Japan
[21] Appl. No. 832,987
[22] Filed June 13, 1969
[45] Patented Jan. 11, 1972
[73] Assignee Matsushita Electric Industrial Co., Ltd.
Osaka, Japan
[32] Priority June 26, 1968
[33] Japan
[31] 43/45345

[54] CROSS-COLOR ELIMINATING APPARATUS FOR A TELEVISION RECEIVER
9 Claims, 9 Drawing Figs.

[52] U.S. Cl. .......... 178/5.4 R, 325/474
[51] Int. Cl. .......... H04m 9/12
[50] Field of Search .......... 178/5.4 R; 325/475, 476, 474

[56] References Cited
UNITED STATES PATENTS
2,729,698 1/1956 Fredendall .......... 178/5.4
2,895,004 7/1959 Fredendall .......... 178/5.4

*Primary Examiner*—Robert L. Richardson
*Assistant Examiner*—Donald E. Stout
*Attorney*—Wenderoth, Lind & Ponack

ABSTRACT: A cross-color eliminating apparatus for a color television receiver. A prediction means separates luminance components from composite color video signals. Estimation means are coupled to said prediction means and estimate the possibility of cross-color interference. Control signals from said estimation means control an interruption means to interrupt the transmission of a chrominance signal during a time interval which is long enough to eliminate cross color.

INVENTORS
REIICHI SASAKI
YOSHITOMI NAGAOKA

BY Wenderoth, Lind & Ponack
ATTORNEYS

INVENTORS
REIICHI SASAKI
YOSHITOMI NAGAOKA

BY Wenderoth, Lind & Ponack
ATTORNEYS

INVENTORS
REIICHI SASAKI
YOSHITOMI NAGAOKA

BY Wenderoth, Lind & Ponack
ATTORNEYS

INVENTORS
REIICHI SASAKI
YOSHITOMI NAGAOKA

BY Wenderoth, Lind & Ponack
ATTORNEYS

INVENTORS
REIICHI SASAKI
YOSHITOMI NAGAOKA

BY Wenderoth, Lind & Ponack
ATTORNEYS

CROSS-COLOR ELIMINATING APPARATUS FOR A TELEVISION RECEIVER

BACKGROUND OF THE INVENTION

1. Field of the Invention

This invention relates to a cross-color eliminating apparatus for a color television receiver, and more particularly to a cross-color eliminating apparatus for removing cross-color interferences which appear on an image reproduced from a composite color video signal.

2. Description of the Prior Art

In a color television system the frequency components of the luminance and chrominance signals consist respectively of line spectra, the component frequencies of which are separated by harmonics of the line frequency. By being interleaved between the luminance frequencies, the chrominance frequencies share the luminance passband near its high-frequency end. The detected luminance signal in a receiver contains the color subcarrier which produces crawling dots and edges. These effects are eliminated by rolloff or notch filters in the luminance channel of the receiver.

Likewise, the luminance signal adds to the chrominance signal and produces a spurious effect which causes checkered patterns to scintillate in color. Such effect is called the cross-color effect, cross-color interference, or simply cross-color. These effects are quite objectionable, and are inherent in all band-sharing systems, such as the NTSC, PAL and SECAM systems. The following description of the NTSC system is given as an example to aid in understanding this effect.

Up to this time, the method of eliminating cross-color has been to utilize frequency interleaving by using a 1H, i.e., a one-horizontal line, delay line. According to the principle of frequency interleaving, there is the following relation between the color subcarrier frequency $f_s$ and the line frequency $f_H$:

$$f_s=(2n+1/2)f_H$$

where $n$ is an integer.

If a television picture is a vertically correlated image, that is, there is no abrupt change in the vertical direction, the luminance signals have almost the same waveforms for a given line and a succeeding line. The modulated chrominance signals also have almost the same envelope, but the phase difference between the subcarriers of two succeeding lines is 180°. When a composite color video signal is subtracted from the preceding signal which has been delayed 1H, the luminance signal can be eliminated and only the chrominance signal remains. Therefore, cross-color interference can be almost completely eliminated from NTSC receivers by using a 1H delay line.

The 1H delay line used in a NTSC receiver is usually an ultrasonic delay line and requires a very limited tolerance, such as 63.5 microseconds ±13 nanoseconds, over a wide temperature range. Moreover, the correction of errors in delay time requires an especially complicated technique in the receiver production process. This results in a raise of the cost of the delay line and of the receiver.

The technique of employing a 1H delay line is based on the fact that the picture is vertically correlated, and is not effective for a picture with low vertical correlation, for example, a picture in which a line image is inclined at more than 20°.

Whether this technique of improving the picture is used or not is entirely at the option of the receiver manufacturer. However, the defects mentioned above prevent the use of a 1H delay line in practical models of a receiver. The same circumstances prevent practical use in the SECAM and PAL systems. In the PAL system the receiver requires a more costly line, with twice the delay (2H), because the PAL subcarrier is offset by one-quarter of the line frequency instead of one-half of the line frequency, as in the NTSC subcarrier.

SUMMARY OF THE INVENTION

It is an object of this invention to provide a simple and less costly cross-color eliminating apparatus which does not utilize a delay line.

It is another object of this invention to provide a cross-color eliminating apparatus by the use of which the adjustment processes during the production of the receiver can be reduced.

It is another object of this invention to provide a cross-color eliminating apparatus which has a stable operation despite a change in operating conditions, such as temperature or moisture.

It is another object of this invention to provide a cross-color eliminating apparatus capable of eliminating cross-color produced in images having low vertical correlation.

To achieve the foregoing objects, the cross-color eliminating apparatus according to the present invention comprises a prediction means for separating luminance components from composite color video signals, estimating the possibility of cross-color interference, and sending a control signal to interruption means for interrupting the transmission of a chrominance signal during a time interval long enough to eliminate cross-color.

DESCRIPTION OF THE DRAWING

These and other features of the invention will be apparent from the following description of the invention taken in connection with the accompanying drawings, in which.

DESCRIPTION OF THE PREFERRED EMBODIMENT

Figure 1A:
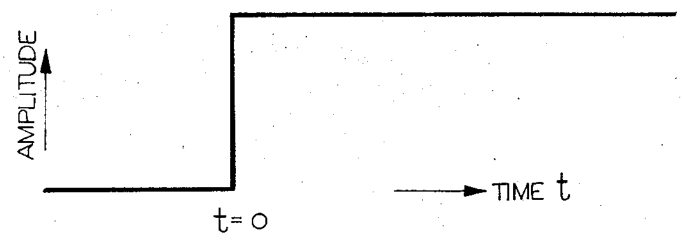
FIG. 1*a* is a graph showing the step waveform of a luminance signal.
Figure 1B:
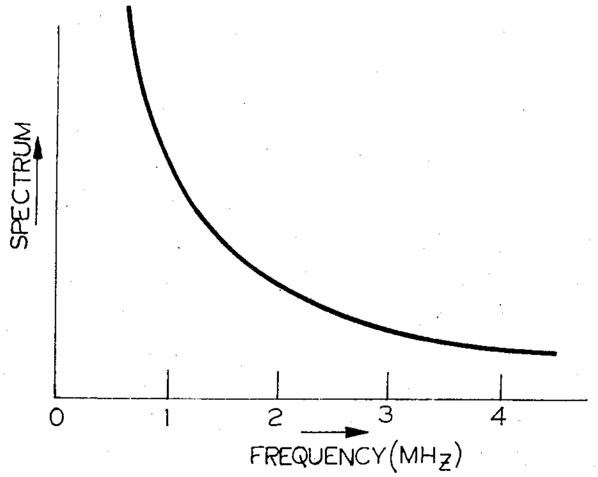
FIG. 1*b* is a graph illustrating the frequency spectrum distribution of the luminance signal in FIG. 1*a;*
Figure 1C:
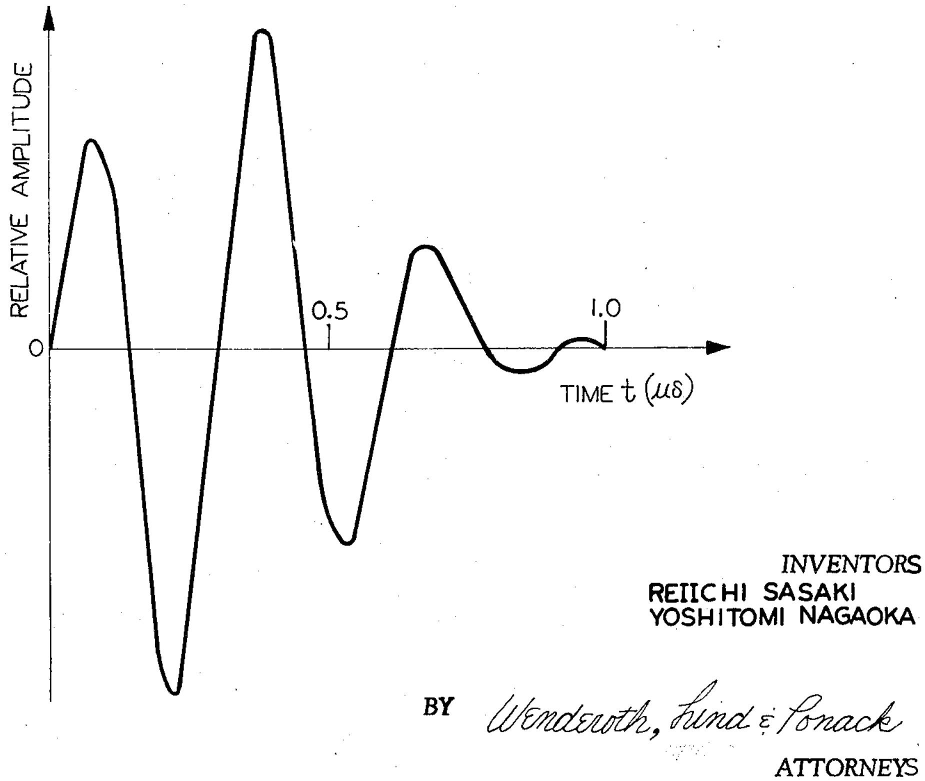
FIG. 1*c* is a graph showing an output waveform of a chrominance amplifier when the luminance signal in FIG. 1*a* is applied to the input thereof.

Turning now to FIG. 1*a*, there is shown the step waveform of a luminance signal having frequency spectra shown in FIG. 1*b*. The frequency spectra are in an inverse proportion to the frequencies. When a step signal is applied to a chrominance amplifier, a ringing wave is obtained as a response, as shown in FIG. 1*c*.

In a practical NTSC receiver, the chrominance amplifier has a bandwidth of about ±0.5 MHz. for the center frequency of 3.58 MHz., although the signal provides 1.5 MHz. for the I and 0.5 MHz. for the Q components. Cross-color interference is caused by the spectrum components of the luminance signal in a frequency range of 3.58 MHz. ±0.5 MHz. The ringing wave shown in FIG. 1*c* is a part of the luminance signal whose frequency components consist of line spectra distributed near the high end of a passband shown in FIG. 1*b*. Therefore, it is possible to predict that the luminance signal components within the frequency range 3.58 MHz. ±0.5 MHz., will occur when components, for example near 2 MHz., are detected in a passband other than 3.58 MHz. ±0.5 MHz., due to the fact that the frequency spectra shown in FIG. 1*b* is expressed in a continuous function for the frequencies. This is true not only for a step signal, but for most signals having an abrupt change.

Figures 2, 6B:
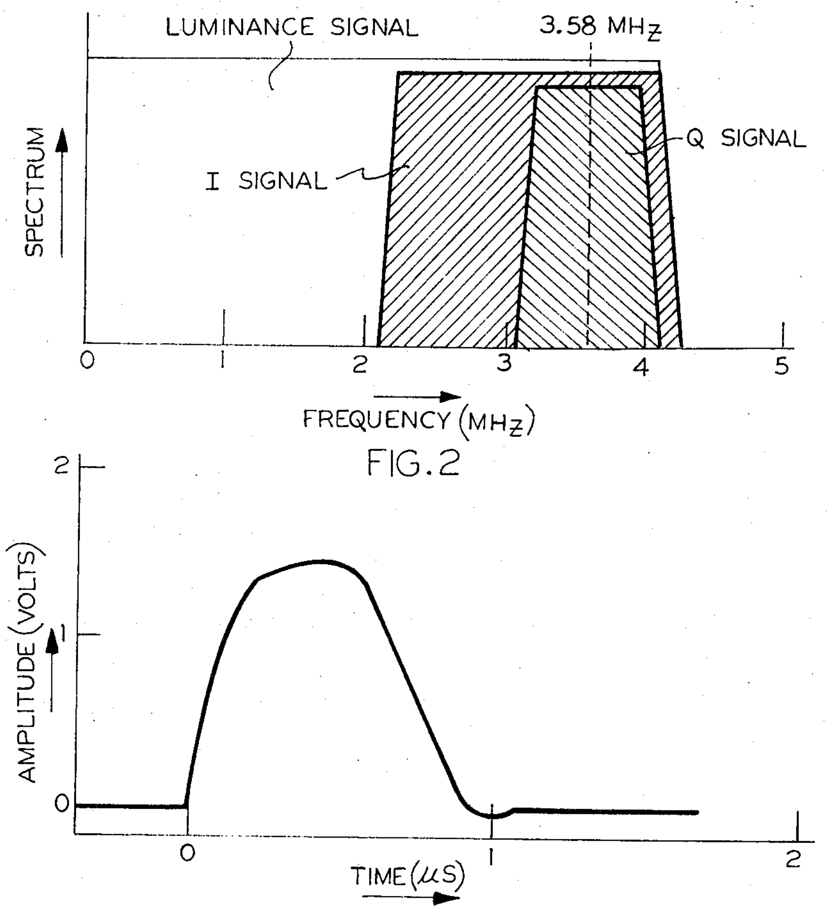
FIG. 2 is a graph illustrating the band sharing of the luminance and chrominance frequencies.
FIG. 6*b* is a graph illustrating the behavior of the gate circuit shown in FIG. 5.

Referring to FIG. 2, the I components of chrominance share a range from 2.1 to 4.2 MHz. and the Q components, a range from 3.1 to 4.1 MHz. The chrominance frequencies share the luminance passband in the high-frequency range. Only a comb-filter using a 1H delay line can separate the luminance signal from the chrominance signal in the frequency range from 2.1 to 4.1 MHz. However, the occurrence of luminance components in the range of 3.58 MHz. ±0.5 MHz. can be nearly always predicted from the occurrence of luminance signal components which are in the frequency range immediately below the chrominance passband, that is in the vicinity from 1 to 2 MHz. The frequencies near 2 MHz. are best suited for the prediction, because it is desirable that these frequencies be as high as possible, in order to increase the accuracy of the prediction. The sampling theorem states that at least $2f_m$ uniformly spaced samples are needed every second in order to reproduce the signal without distortion, where $f_m$ is the maximum frequency component of the signal. The time interval $T=\frac{1}{2}f_m$ is called the Nyquist interval.

The chrominance channel bandwidth is ±0.5 MHz. According to the sampling theorem, the color information can be reproduced without any degradation, even if the sampling of the chrominance signal is done with a pulse train, the repeating period of which is shorter than 1 microsecond. The duration of the cross-color component of the ringing wave is virtually less than 1 microsecond as shown in FIG. 1*c*. Therefore, if the chrominance channel is interrupted during this 1 microsecond span when the ringing wave occurs, then the transmission of the ringing wave, that is the cross-color component, is prevented.

Although the color information during this 1 microsecond is also eliminated, this color information can be reproduced for the following reasons. The interrupting interval of chrominance channel is considered to be the sampling interval which is the time interval between two adjacent sampling pulses of a succession of sampling pulses. This is due to the fact that in the sampling process, the signal information is transmitted by very narrow sampling pulses and no information is transmitted during time interval between two sampling pulses which is approximately equal to the sampling interval. It becomes apparent that the sampling theorum can be applied in this case. Therefore, the color information during the interrupting interval can be reproduced by the smoothing effect of low-pass filters placed after the interruption means as in well-known digital transmission systems. Elimination of cross-color interferences and faithful reproduction of the color information can both be achieved at the same time for the above reasons. The present invention provides a prediction circuit means and an interruption circuit means to carry out this interruption at the proper times.

Figure 3:
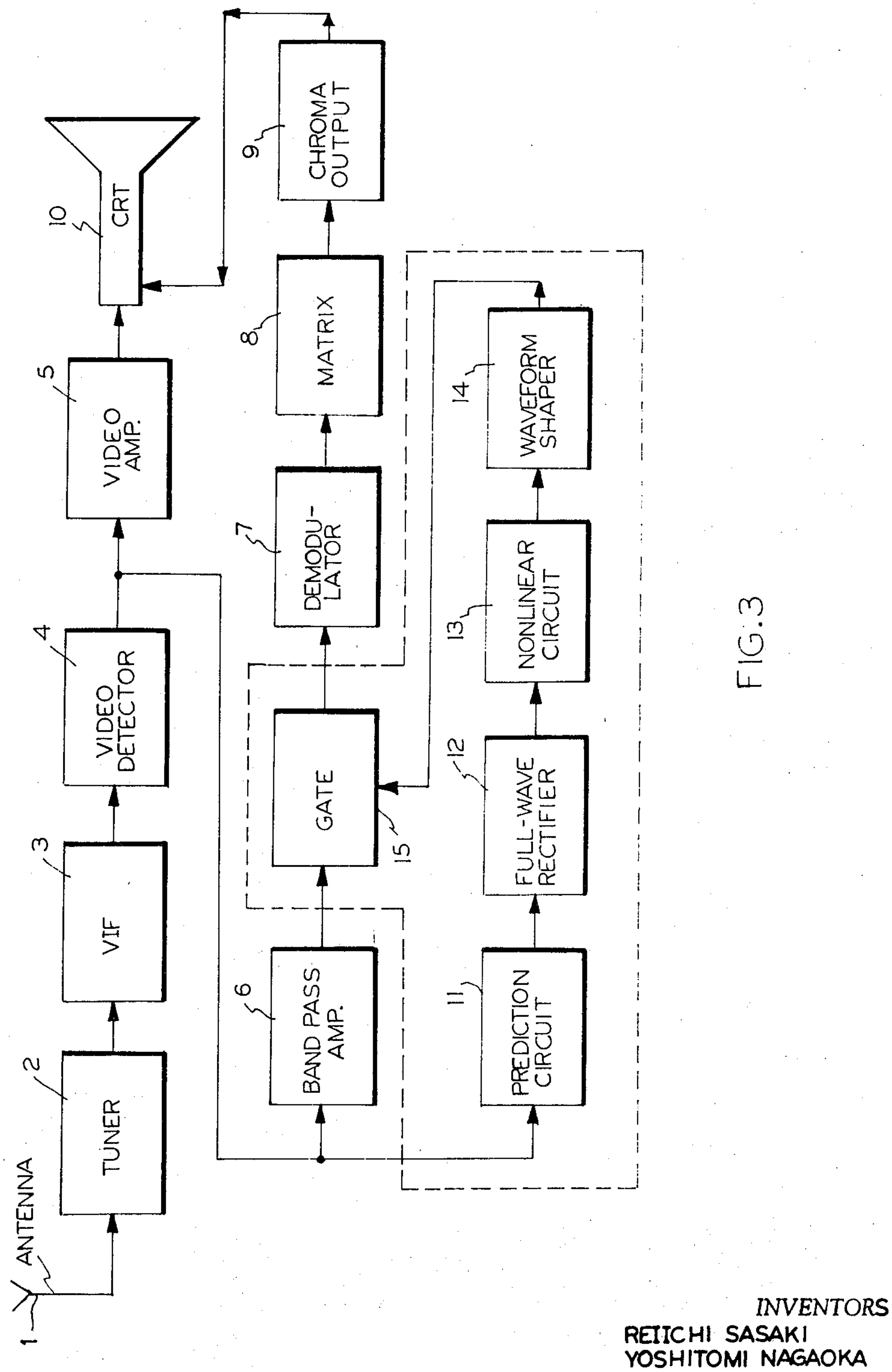
FIG. 3 is a block diagram of an embodiment of the cross-color eliminating apparatus in accordance with the present invention.

Referring to FIG. 3, a prediction circuit 11 separates the luminance components from a composite color video signal which has been received by an antenna 1 and amplified by a tuner 2, a video I.F. amplifier 3, and detected by a detector 4, and the prediction circuit estimates the occurrence of cross-color interference. The output of said prediction circuit 11 is supplied to a full wave rectifier 12 and converted into a unipolar signal. A nonlinear circuit 13 transmits the unipolar signal to a waveform shaper 14 only when the signal exceeds a threshold level. A gate circuit 15 prevents the transmission of a chrominance signal by a control signal from said waveform shaper 14 during a definite time interval.

Said prediction circuit 11 is a narrow band-pass filter for separating frequency components near 2 MHz. from a composite color video signal. The output of said prediction circuit 11 contains only the luminance components. Therefore, the existence of an output means that there may be luminance components in a frequency range of 3.58 MHz. ±0.5 MHz. and that cross-color interference may occur in a reproduced image.

Said full wave rectifier 12 converts a bipolar signal into a unipolar signal, because the luminance signals consist of two polarities; that is, one signal changes from light to shade and the other from shade to light.

Said nonlinear circuit 13 has a threshold level which is set up so as to allow the transmission of only the large signals from said prediction circuit 11. Said nonlinear circuit 13 transmits the part of the input signal which exceeds said threshold level. A small input signal supplied from said prediction circuit 11 which is below said threshold level need not be transmitted by circuit 13. This is because small cross-color components which are predicted by small output signals from said prediction circuit 11 contaminate the picture only slightly and therefore need not be eliminated.

Said waveform shaper 14 shapes or generates a pulse from the output signal of said nonlinear circuit. There are many circuit configurations which can be used as said waveform shaper 14. For example, a one-shot multivibrator, or a pulse generator triggered by an input signal can be used. The pulse width of the output of said waveform shaper 14 is preferably less than 1 microsecond. The bandwidth 0.5 MHz. of the chrominance channel does not allow the transmission of a narrower pulse than 1 microsecond. This 1 microsecond is equal to the maximum time interval permitted by the frequency bandwidth, that is, a Nyquist interval decided by the sampling theorem. Therefore, it is important for the suppression of spurious effects that the chrominance channel is interrupted for a time less than 1 microsecond.

Said gate circuit 15 prevents the transmission of the chrominance signal during a time interval less than 1 microsecond. In FIG. 3 said gate circuit 15 is placed between the chrominance amplifier 6 and a demodulator 7. However, it is possible to insert said gate circuit 15 between any two adjacent elements in series connected group of elements consisting of a chrominance amplifier 6, a demodulator 7, a matrix circuit 8, an output amplifier 9, and a picture tube 10. Said ate circuit can also be inserted between a color subcarrier oscillator and a demodulator, since a demodulator cannot operate without a color subcarrier.

Figure 4:
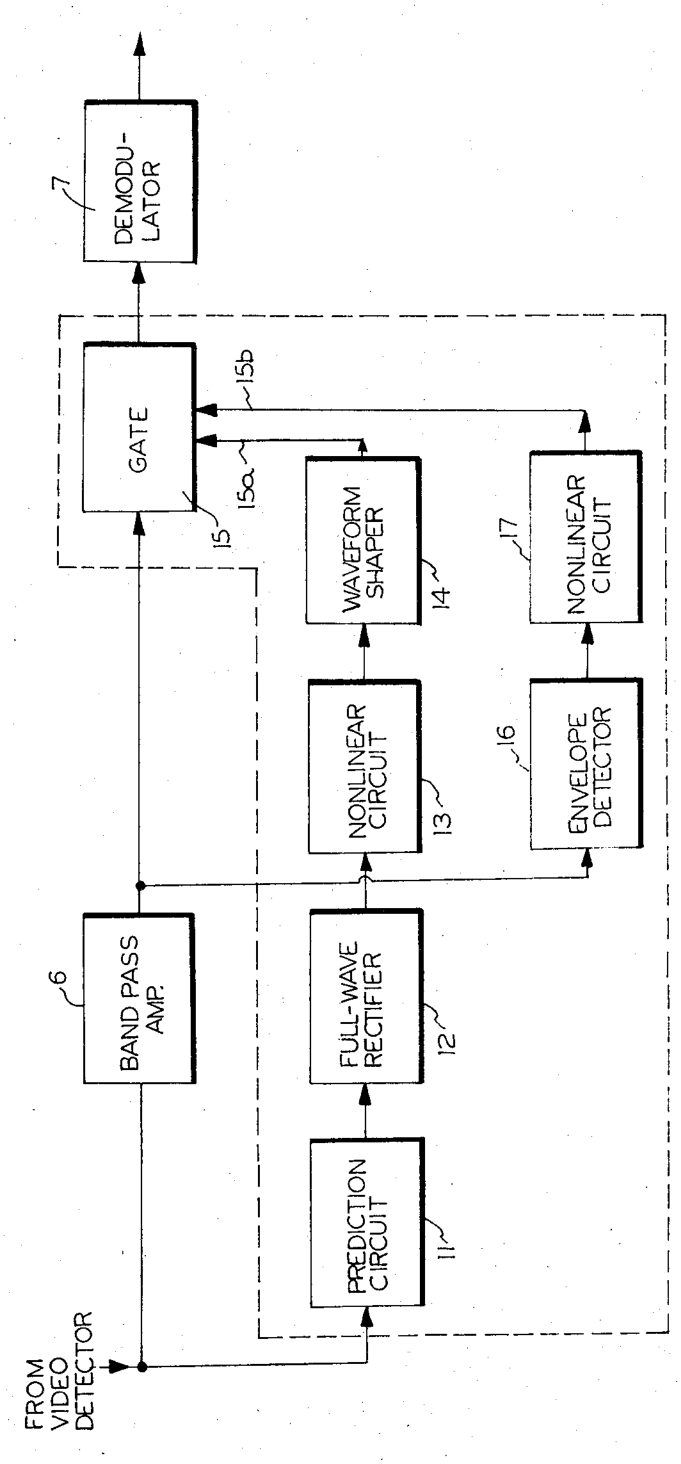
FIG. 4 is a block diagram of another embodiment of the cross-color eliminating apparatus in accordance with the present invention.

Referring to FIG. 4, wherein similar reference numbers designate elements similar to those of FIG. 3, the operation of the prediction circuit 11, full wave rectifier 12, nonlinear circuit 13, and waveform shaper 14 are the same as those of FIG. 3. And further, there is a gate circuit 15 having two control terminals 15*a* and 15*b*, an envelope detector 16 coupled to a chrominance amplifier 6 for taking out a chrominance signal envelope detector and said control terminal 15*b* in order to allow the transmission of a chrominance signal regardless of the output of said waveform shaper 14, when the amplitude of a chrominance signal envelope exceeds a certain level.

Said first control terminal 15*a* of said gate circuit 15 is supplied with a pulse from said waveform shaper 14 in order to prevent the transmission of a chrominance signal during a time interval of a pulsewidth less than 1 microsecond. Said second control terminal 15*b* is supplied with another signal which cancels the operation of the pulse applied to said first control terminal 15*a*. Thus, said gate circuit 15 cannot prevent the transmission of a chrominance signal even if the pulse is applied to said second control terminal 15*a*. The control signal applied to said second control terminal 15*b* is an output signal having a larger amplitude than the threshold level of said nonlinear circuit 17.

Said envelope detector 16 detects an envelope of a chrominance signal which is an output of the chrominance amplifier 6. The detected chrominance signal envelope is applied to said nonlinear circuit 17 having the above-described threshold level. It is desirable that he threshold level be slightly smaller than an envelope of a chrominance signal transmitting a saturated color signal. This is effective to prevent the possibility of spurious color elimination in a part of a saturated color picture in which cross-color interference is hardly perceived due to the masking effect of the eye.

Figure 6A:
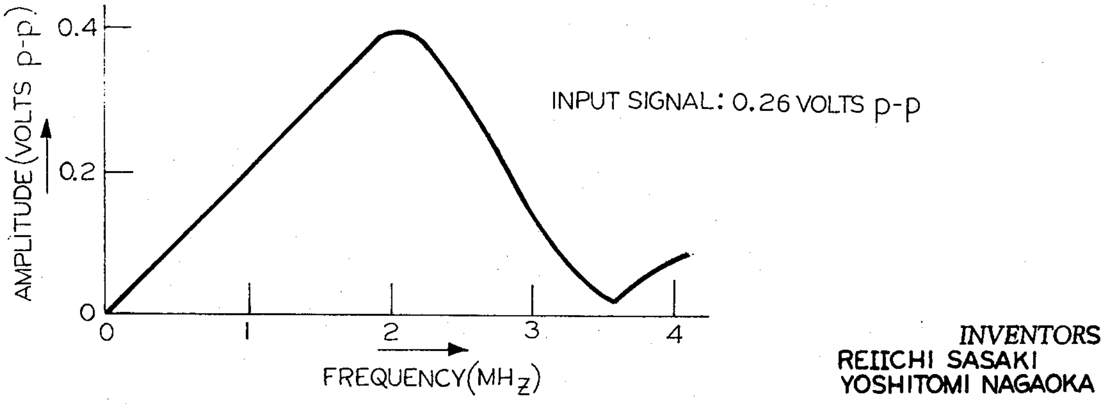
FIG. 6*a* is a graph illustrating the frequency response characteristic of the prediction circuit shown in FIGS. 5.
Figure 5:
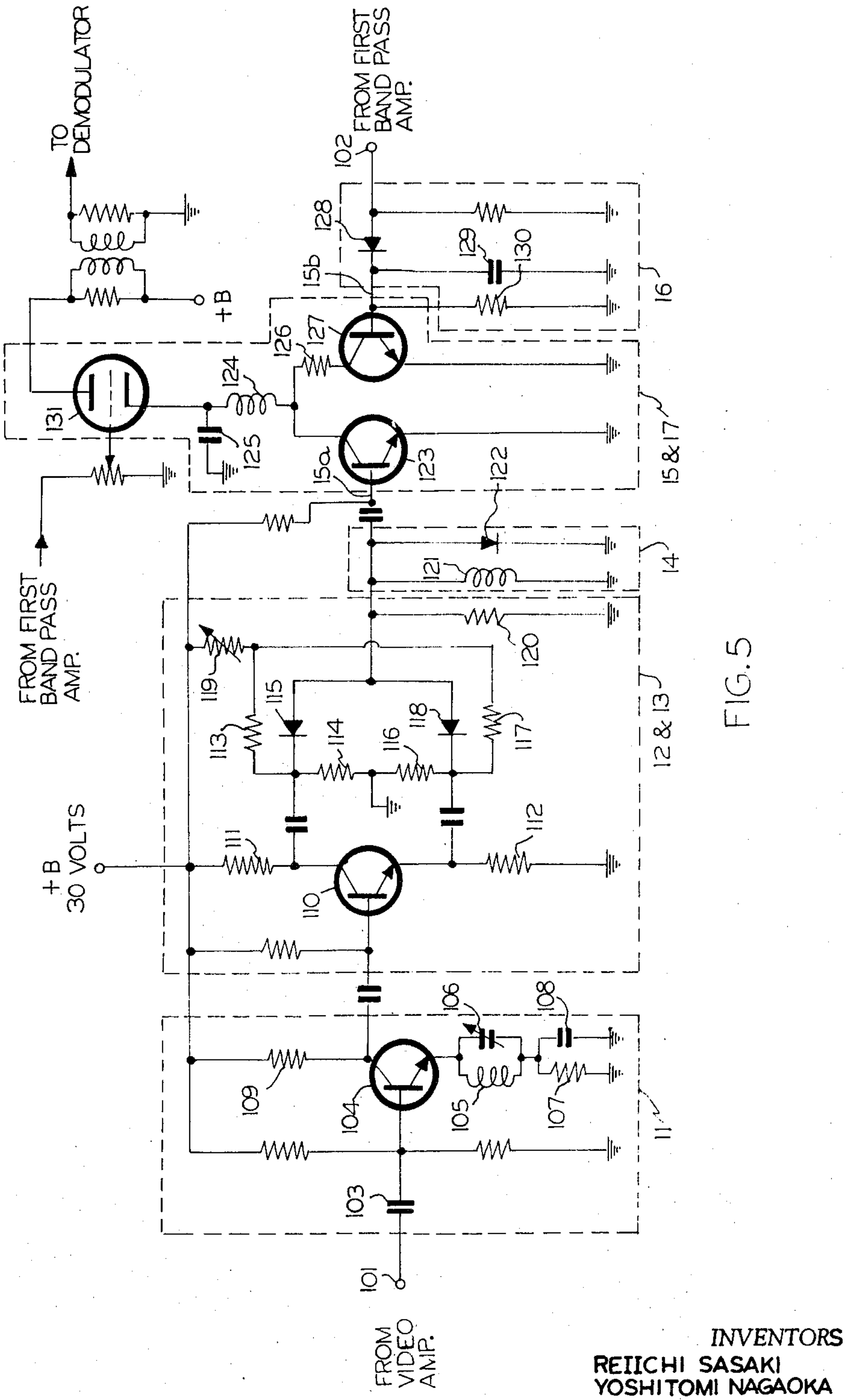
FIG. 5 is a schematic circuit diagram of one practical use of an embodiment according to the principles of the present invention.

Referring to FIG. 5, there is shown a schematic circuit diagram of the embodiment of the present invention shown in FIG. 4. In FIG. 5 similar reference numbers are used to indicate the circuit elements, which elements are surrounded with a dotted line. The prediction circuit 11 comprises a capacitor 103 connected between an input terminal 101 and the base of a transistor 104 in order to separate high-frequency spectra from a composite color video signal. A parallel connected inductor 105 and variable capacitor 106 are connected to an emitter of said transistor 104 and form a parallel resonance circuit to trap a color subcarrier. A parallel connection of a resistor 107 and a capacitor 108 connected between the inductor 105 and ground peaks the high-frequency response and compensates for the high-frequency characteristics of an amplifier comprising said transistor 104 and a load resistor 109. The frequency characteristic of said prediction circuit 11 is shown in FIG. 6*a*. The peak response frequency is 2 MHz. A wide bandwidth is necessary to improve the time response. The prediction circuit 11 in this embodiment of the present invention has a response in a frequency range from 2 to 3 MHz., said frequency range including both the luminance and chrominance signals. However, the chrominance signal components are usually so small in those frequencies that said nonlinear circuit 13 prevents the transmission thereof.

The aforesaid full wave rectifier 12 comprises a collector-and-emitter loaded transistor 110 having resistors 111 and 112 connected to its collector and emitter respectively. Two diodes 115 and 118 are connected to the collector and emitter of said transistor 110 respectively so as to produce outputs of equal polarity. A grounded resistor 120 is connected to a junction of said two diodes 115 and 118. The output signals at the collector and emitter of said transistor 110 are of equal amplitude and of opposite polarity to each other. Since a applied to the input terminal 101 is amplified by said transistor 104 and rectified by said two diodes 115 and 118, a bipolar signal is converted into a unipolar signal.

Said nonlinear circuit 13 comprises the reverse-biased diodes 115 and 118; resistors 113 and 114 in series with a variable resistor 119; and resistors 117 and 116 also in series with said resistor 119. The combination of said resistors 113, 114, 116, 117 and 119 supplies the reverse bias voltages to said diodes 115 and 118. These reverse bias voltages are at a threshold level and are established by the adjustment of said resistor 119. When a signal from said transistor 110 is larger than the threshold level, a pulse signal appears across said resistor 120. Said reverse-biased diodes 115 and 118 are nonlinear in action and also behave as a full wave rectifier circuit.

Said waveform shaper 14 comprises an inductor 121 and a damping diode 122 both in parallel with said resistor 120 and with each other. Said inductor 121 differentiates a signal across said resistor 120 and shapes the pulse. Said damping diode 112 clips a positive part of the ringing wave produced by said inductor 121 and a stray capacitance, when a negative signal is applied to said inductor 121.

Said gate circuit 15 comprises a second chrominance amplifier 131 which amplifies the chrominance signal. A transistor 123 is coupled to the cathode of a chrominance amplifier 131. Said transistor 123 is biased to sustain its conduction when no signal is applied to said first control terminal 15*a*. Therefore, said chrominance amplifier 131 operates in the normal condition. However, when a negative pulse is applied to said control terminal 15*a*, said transistor 123 is cut off and said chrominance amplifier 131 is also cut off. A low-pass filter consisting of an inductor 124 and a capacitor 125 is inserted between the cathode of said chrominance amplifier 131 and the collector of said transistor 123. This low-pass filter eliminates the spurious transient pulse which is generated at the moment of changing to ON or OFF by said transistor 123. In FIG. 6*b*, there is shown the pulse waveform appearing at the cathode of said chrominance amplifier 131. Its pulse width $\tau$ is approximately 0.7 microsecond.

Said envelope detector 16 comprises a diode 128 with a discharge resistor 130 is parallel with a capacitor 129. Said diode 128 detects the envelope of a chrominance signal applied to the input terminal 102 of said envelope detector 16 from the first chrominance amplifier and supplies a positive signal to a transistor 127.

Said nonlinear circuit 17 comprises transistor 127 having a threshold level, and connected to the cathode of said chrominance amplifier 131 through resistance 126. Said transistor 127 is usually in the OFF state. When a larger positive signal than the threshold level is applied to the base of said transistor 127, said transistor 127 turns from the OFF to the ON state. In this condition said second chrominance amplifier 131 continues its operation, even if said transistor 123 is cut off.

In the circuit given as the specific example in FIG. 5, satisfactory results are obtained by employing the following specified components:

| | |
|---|---|
| Capacitor 103 | = 28 pF |
| Transistor 104 | = Silicon transistor 2SC538A |
| Inductor 105 | = 27 $\mu$H |
| Capacitor 106 | = 56 pF≈76 pF (Variable) |
| Resistor 107 | = 1 kΩ |
| Capacitor 108 | = 100 pF |
| Resistor 109 | 5.6 kΩ |
| Transistor 110 | = Silicon transistor 2SC538A |
| Resistor 111 | = 1 kΩ |
| Resistor 112 | = 1 kΩ |
| Resistor 113 | = 82 kΩ |
| Resistor 114 | = 12 kΩ |
| Diode 115 | = Germanium diode OA70 |
| Resistor 116 | = 12 kΩ |
| Resistor 117 | = 82 kΩ |
| Diode 118 | = Germanium diode OA70 |
| Resistor 119 | = 0≈100 kΩ (Variable) |
| Resistor 120 | = 3.3 kΩ |
| Inductor 121 | = 330 $\mu$H |
| Diode 122 | = Germanium diode OA70 |
| Transistor 123 | = Silicon transistor 2SC538A |
| Inductor 124 | = 120 $\mu$H |
| Capacitor 125 | =680 pF |
| | =100Ω |
| Transistor 127 | = Silicon transistor 2SC538A |
| Diode 128 | = Germanium diode OA70 |
| Capacitor 129 | = 39 pF |
| Resistor 130 | = 5.6 kΩ |

As mentioned with reference to FIGS. 3–6, the simple circuit configuration according to the present invention satisfactorily eliminates cross-color interference from images of a color television receiver in a practical manner.

Further, the circuit configuration according to the invention requires no special components such as a 1H delay line. Therefore the cost of the cross-color eliminating apparatus of the present invention is lower than that of a 1H delay line used in a NTSC receiver and is lower by even more than that used in a PAL delay line. A PAL receiver requires a more costly line, with a 2H delay, because the PAL subcarrier is offset by one-quarter of the line frequency instead of one-half of the line frequency as is the case with the NTSC subcarrier.

The principle of the invention has been illustrated with the NTSC system. It is to be understood that these principles are applicable to other systems, such as the PAL and SECAM systems.

What is claimed is:

1. A cross-color eliminating apparatus for a color television receiver having a source of composite color video signals and a chrominance channel, said apparatus comprising a prediction means coupled to the source of composite color video signals for separating luminance signal components from said composite color video signals, estimation means coupled to said prediction means and including detecting means for detecting the presence of certain components in the luminance signal components which indicate the possibility of the occurrence of cross-color interference and signal producing means responsive to said detecting means for producing a control signal when the certain components are detected and cross-color interference is likely, and interruption means coupled between any two adjacent elements of the chrominance channel and which has two input terminals, one of which is coupled to the source of chrominance signals through the chrominance channel and the other of which is coupled to said estimation means, said interruption means being responsive to said control signal for interrupting the transmission of said chrominance signal for a time interval long enough to eliminate crossecolor interference.

2. A cross-color eliminating apparatus as claimed in claim 1 wherein said prediction means comprises a band-pass filter centered near the low-frequency end of the chrominance sidebands.

3. A cross-color eliminating apparatus as claimed in claim 1, wherein said estimation means comprises a full wave rectifier which is coupled to said prediction means and which converts the output signal of said prediction means into a unipolar signal, and a nonlinear circuit coupled to said full wave rectifier and having a threshold level which allows only the transmission of a large unipolar signal.

4. A cross-color eliminating apparatus as claimed in claim 1 wherein said interruption means comprises a waveform shaper which is coupled to said estimation means and which shapes a pulse to have a definite width which has a duration sufficient to eliminate cross-color interference, and a gate circuit which is coupled to said waveform shaper and for preventing the transmission of a chrominance signal in the chrominance channel during a time interval determined by said pulse width.

5. An interruption means as claimed in claim 4 wherein said waveform shaper comprises a single pulse generator triggered by the output of said estimation means.

6. An interruption means as claimed in claim 4 wherein said gate circuit coupled to said waveform shaper comprises a circuit means for preventing the transmission of a color subcarrier to a demodulator.

7. A cross-color eliminating apparatus as claimed in claim 1 wherein said interruption means comprises said waveform sharper which is coupled to said estimation means and which shapes a pulse to have a definite width which has a duration sufficient to eliminate cross-color interference, an envelope detector which is coupled to a chrominance amplifier and which takes out a chrominance signal envelope, a nonlinear circuit coupled to said envelope detector having a threshold level, and a gate circuit having two control terminals, one of which is coupled to said waveform shaper for preventing the transmission of a chrominance signal in the chrominance channel during an interval determined by said pulse width and the other of which is coupled to said nonlinear circuit for allowing the transmission of a chrominance signal regardless of the output pulse of said waveform shaper whenever the amplitude of the chrominance envelope signal exceeds said threshold level.

8. An interruption means as claimed in claim 7 wherein said waveform shaper comprises a single pulse generator triggered by the output of said estimation means.

9. An interruption means as claimed in claim 7 wherein said gate circuit coupled to said waveform shaper comprises a circuit means for preventing the transmission of a color subcarrier to a demodulator.

* * * * *